(12) United States Patent
Ibrahim et al.

(10) Patent No.: US 7,639,878 B2
(45) Date of Patent: Dec. 29, 2009

(54) SHADOW DETECTION IN IMAGES

(75) Inventors: Mohamed M. Ibrahim, Kayalpatnam (IN); Anupama Rajagopal, Coimbatore (IN)

(73) Assignee: Honeywell International Inc., Morristown, NJ (US)

( * ) Notice: Subject to any disclaimer, the term of this patent is extended or adjusted under 35 U.S.C. 154(b) by 764 days.

(21) Appl. No.: 11/281,037

(22) Filed: Nov. 17, 2005

(65) Prior Publication Data

US 2007/0110309 A1    May 17, 2007

(51) Int. Cl.
G06K 9/46 (2006.01)
G06K 9/66 (2006.01)
G06K 9/48 (2006.01)
G06K 9/00 (2006.01)
H04N 5/225 (2006.01)

(52) U.S. Cl. ............... 382/190; 382/103; 382/199; 348/169

(58) Field of Classification Search ............ 382/103, 382/190, 199; 348/169
See application file for complete search history.

(56) References Cited

U.S. PATENT DOCUMENTS

| 5,592,567 | A * | 1/1997 | Kilger | 382/199 |
| 6,349,113 | B1 | 2/2002 | Mech et al. | |
| 2007/0104389 | A1 * | 5/2007 | Wells | 382/274 |

FOREIGN PATENT DOCUMENTS

WO    WO-2007061779 A1    5/2007

OTHER PUBLICATIONS

Ibrahim, Mohd. M., et al., "Scene Adaptive Shadow Detection", *Enformatika Transactions on Engineering*, 42, (Dec. 2004),88-91.
Bevilacqua, Alessandro , "Effective Shadow Detection in Traffic Monitoring Applications", *Journal of WSCG*, 11(1), (Feb. 3-7, 2003,),1-8.
Cucchiara, R. , et al., "Improving shadow suppression in Moving Object Detection with HSV colour information", *2001 IEEE Intelligent Transportation Systems Conference Proceedings*, (2001),334-339.
Horprasert, Thanarat , et al., "A Statistical Approach for Real-time Robust Background Subtraction and Shadow Detection", *7th IEEE ICCV Frame-Rate Workshop Conference Proceedings*, (1999),1-19.

(Continued)

*Primary Examiner*—Brian P Werner
*Assistant Examiner*—Randolph Chu
(74) *Attorney, Agent, or Firm*—Schwegman, Lundberg & Woessner, P.A.

(57) ABSTRACT

In an embodiment, a novel, scene adaptive, robust shadow detection method has been disclosed. An adaptive division image analysis compares one or more images containing objects and shadows to a reference image that is void of the objects and shadows. Ratios are calculated comparing the frame with shadows and/or objects to the reference frame. Shadows are identified by identifying pixels that fall within a certain range of these ratios. In another embodiment, projection histograms are used to identify the penumbra region of shadows in the image.

19 Claims, 8 Drawing Sheets

OTHER PUBLICATIONS

Javed, Omar, et al., "Tracking and Object Classification for Automated Surveillance", *Proceedings of the 7th European Conference on Computer Vision-Part IV*, (2002),343-357.

Kaewtrakulpong, P., et al., "An Improved Adaptive Background Mixture Model for Realtime Tracking with Shadow Detection", *Proc. 2nd European Workshop on Advanced Video Based Surveillance Systems*, AVBS01., (Sep. 2001),1-5.

Rosin, Paul L., et al., "Image difference threshold strategies and shadow detection", *6th BMVC 1995 Conference Proceedings*, Birmingham, UK,(1995),347-356.

Stander, J., et al., "Detection of moving cast shadows for object segmentation", *IEEE Transactions on Multimedia*, 1(1), (Mar. 1999),65-76.

* cited by examiner

| SCENE | AVERAGE [RTOPS RATIO] | AVERAGE [RTO RATIO] | AVERAGE [RTS RATIO] |
|---|---|---|---|
|  | 78 | 62 | 121 |
|  | 73 | 59 | 96 |
|  | 87 | 78 | 134 |
|  | 69 | 54 | 86 |

SHADOW DETECTION IN IMAGES

TECHNICAL FIELD

Various embodiments of the invention relate to the field of image processing, and in particular, but not by way of limitation, to the processing of shadows in image data.

BACKGROUND video motion detection (VMD) is the backbone functionality for most Intelligent Video Surveillance (IVS) systems, and the robustness of the system is one of the primary performance criteria for an IVS system. For without a robust motion detection engine, the subsequent functionalities in an IVS system will not be accurate or reliable. One of the key factors in enhancing the robustness of dynamic video analysis is to provide an accurate and reliable means for shadow detection. For if left undetected, shadow pixels can cause problems such as object merging and object shape distortion, and may result in incorrect object tracking and classification.

Most of the shadow tracking algorithms known in the art are computationally intensive—some to the extent of equaling the computational requirements of the motion detection algorithm. Many of these known shadow detecting algorithms take into account a priori information, such as the geometry of the scene or of the moving objects, and the location of the light source. Algorithms that don't require any such a priori information exploit such things as spatial information (e.g., shadows in an image frame are attached to their respective object), transparency (i.e., a shadow always makes the region it covers darker; this involves the appearance of single pixels), and/or homogeneity (the ratio between pixels when illuminated and the same pixels under shadow is roughly linear).

One method of shadow detection known in the art computes an intensity ratio between the current image and the reference image for each pixel within the detected blobs. This method uses the characteristic that the photometric gain of a shadow with respect to the background image is less than unity and roughly constant over the whole shadow region, except at the edges (the penumbra region). In this method, a priori assumptions regarding certain shadow identification rules result in the detection only of shadows with quite a large area with respect to the object itself.

In another method of shadow detection known in the art, the shadow detection algorithm initially decomposes the difference between the background image and the current image into brightness and chromaticity components. Then, a preset threshold is applied on the separate components. This yields a pixel classification into background, shadow or foreground categories.

In another method known in the art, the method is applied to gray level images taken by a stationary camera. The method uses the property of a moving cast shadow that its illumination change (measured directly from two frames using a physics-based signal model of the appearance of a shadow) is smooth. The system prepares two distinct modules to detect penumbra and shadows separately. The first module uses a two-frame difference between subsequent frames as the input image. A linear luminance edge model is applied to detect likely shadow boundaries. Further, a Sobel operator is measured perpendicularly to the borders and the results are made to be thresholds using both a gradient outcome and an edge model. The second module computes the ratio between two subsequent images and thresholds on the local variance.

Another shadow detection approach known in the art is based on the similarity of background and shadow regions. A color segmentation method using a K means algorithm segments the pixels as a cast shadow, a self-shadow, or a dark object. This is followed by a connected component analysis to merge the similar regions. A gradient comparison between the background image and the shadow pixels gives a validation for removing the shadow.

Another shadow detection approach known in the art explores the HSV (Hue, Saturation, and intensity Values) color space. The hue, saturation & intensity values are checked individually in order to determine if the values lie between certain ranges. A shadow mask is thus formed having the values 1 or 0 based on the conditions satisfied. A difficulty with this method is in fixing the range values for H, S and V.

All of the aforementioned techniques of the prior art suffer from one or more shortcomings. Those techniques that are based on the homogeneity property of shadows assume that the ratio between pixels when illuminated and when subjected to a shadow is constant. In fact however, that ratio is highly dependent on illumination in the scene, and shadow correction therefore is not effective in these prior art systems where the ratio is assumed to be constant. Additionally, approaches that employ techniques like multi-gradient analysis to remove the penumbra region of a shadow that is left by image division analysis are computationally intensive. The art is therefore in need of an improved system and method to process shadow information in image data.

DETAILED DESCRIPTION

Figure 1:
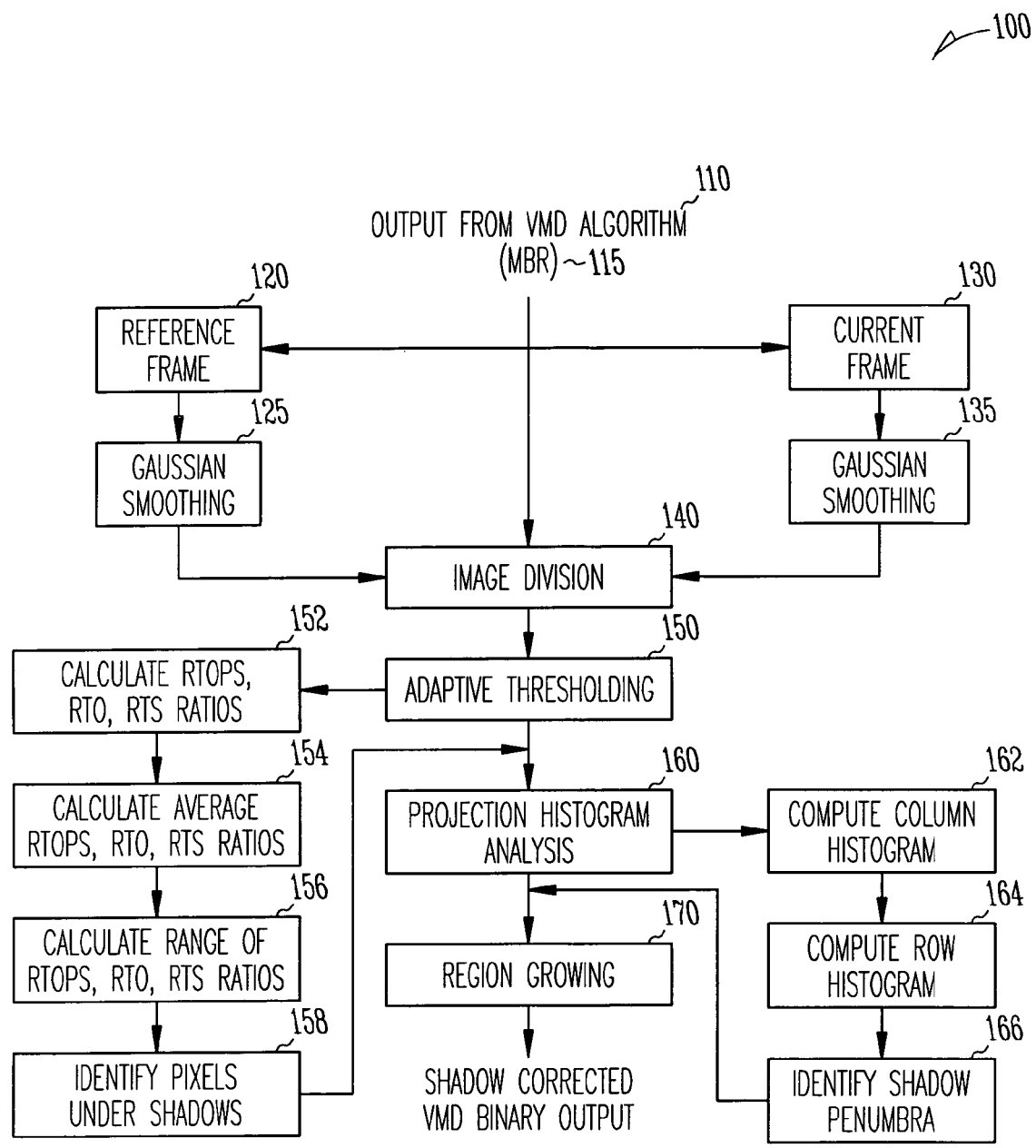
FIG. 1 illustrates a flowchart of an example embodiment of a process to remove a shadow from image data.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, shadows are detected in an image by using a novel application of the homogeneity property of shadows. First, a hierarchical approach with an adaptive image division analysis identifies likely shadow regions. Then, a relatively simple projection histogram technique is used for penumbra region correction.

A flow chart of a shadow detection and correction process 100 for an example embodiment is depicted in FIG. 1. A Video Motion Detection (VMD) algorithm 110 in an Intelligent Video Surveillance (IVS) system supplies a detected blob of a moving object in a current frame 130 with a Minimum Bounding Rectangle (MBR) 115 associated with that object. The algorithm 100 proceeds with hierarchical processing of image division analysis 140, an adaptive threshold process 150, and a projection histogram analysis 160. Before the image division and the projection histogram analyses, the current frame 130 and a reference frame 120 are subjected to Gaussian smoothing processes (125, 135). Then, after the projection histogram analysis 160, the blob (or image) is subjected to a region growing process 170.

In the image division analysis 140, the homogeneity property of a shadow is used to localize a likely shadow region. A division image is computed for an MBR 115 of a moving object independently between a smoothed reference image (120, 125) and a smoothed input image (130, 135). The background image obtained as a result of Foreground—Background learning in the VMD algorithm 110 serves as the reference image 120. In order to make an adaptive threshold operation 150 more reliable, a scaling factor is applied to the division image 140. While existing approaches in the art that use a form of image division analysis identify shadows in an image by determining if a pixel falls within a hard-coded range (for example setting a grayscale range 50-80 as belonging to shadows), an embodiment of the invention varies, or adapts, this shadow-identifying range depending on the illumination in an image. How this range can vary is illustrated in FIG. 2.

Figure 2:
FIG. 2 reports a set of ratios relating a reference image to an object in an image, a shadow in an image, and a combination of an object and a shadow in an image.
Figure 2:
Figure 2:
Figure 2:
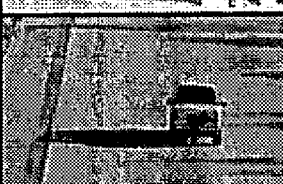

In FIG. 2, RTOPS refers to the reference image to the object plus shadow ratio, RTO refers to the reference image to object ratio, and RTS refers to the reference image to shadow ratio. To arrive at the values in the table for each of the four different scenes in FIG. 2, a reference frame 120 (a shot of the scene without the object of interest thereby creating a background reference) is compared to a current frame (with the object of interest). To arrive at the RTOPS values in the first column of FIG. 2, the reference frame without the object and shadow is compared to the object and shadow in the current frame (152). To arrive at the RTO ratios in the second column in FIG. 2, the reference frame without the object and shadow is compared to the object in the current frame. And to arrive at the RTS ratios in the third column of FIG. 2, the reference frame without the object and shadow is compared to the shadow in the current frame.

More specifically, to calculate the RTOPS values in FIG. 2, the object and its shadow are manually segmented from the frame. The Minimum Bounding Rectangle (MBR) coordinates that surround the object and its shadow are determined. Then, for each pixel in the MBR, the intensity value for those pixels are compared to the corresponding pixel intensity values in the reference frame. This results in an RTOPS value for each pixel in the MBR, and an average of all these values is determined (154). It is this average value for an MBR that is reported in the RTOPS column in FIG. 2.

The computations of the ratios in the RTO and RTS columns of FIG. 2 are performed in a similar manner. For the RTO computation, the object without its shadow is manually segmented from the rest of the frame. The MBR coordinates are computed, and for each pixel in the MBR, the ratio of the intensity value of those pixels to the corresponding pixels in the reference frame are computed. It is the average of all these ratio values that is reported in the RTO column in FIG. 2. And for the RTS ratio, the shadow of the object (without the object) is manually segmented from the rest of the image, ratios of pixel intensity between the image frame an the reference frame are calculated for each pixel in the MBR, and an average value of these ratios is reported in the RTS column in FIG. 2.

These ratios from the four differently illuminated scenes in FIG. 2 provide a range of values (156) in which shadow pixels may fall for these four differently illuminated scenes. In the example of FIG. 2, the range of these values falls in the range of 1.2 to 1.6 times the average RTOPS ratio. For example, the RTS value of 121 for the first scene in FIG. 2 is 1.5 times the RTOPS average value of 78 for that scene. Different ratios may be obtained depending on the scenes and the illumination of those scenes.

Continuing with the example of FIG. 2, and referring to the image in the first row in FIG. 2, the average ratio of the reference image to object plus shadow (RTOPS) image is equal to 78. Consequently, a pixel is identified as being under a shadow if its grayscale range falls into the range of approximately 86 to 125 (158). This range is calculated as follows:

$$1.2*78=86.6$$

$$1.6*78=124.8$$

The appropriate range for the three remaining images in FIG. 2 could likewise be calculated, and for any reference image 120 and current image 130 from a VMD algorithm 110.

Figure 3:
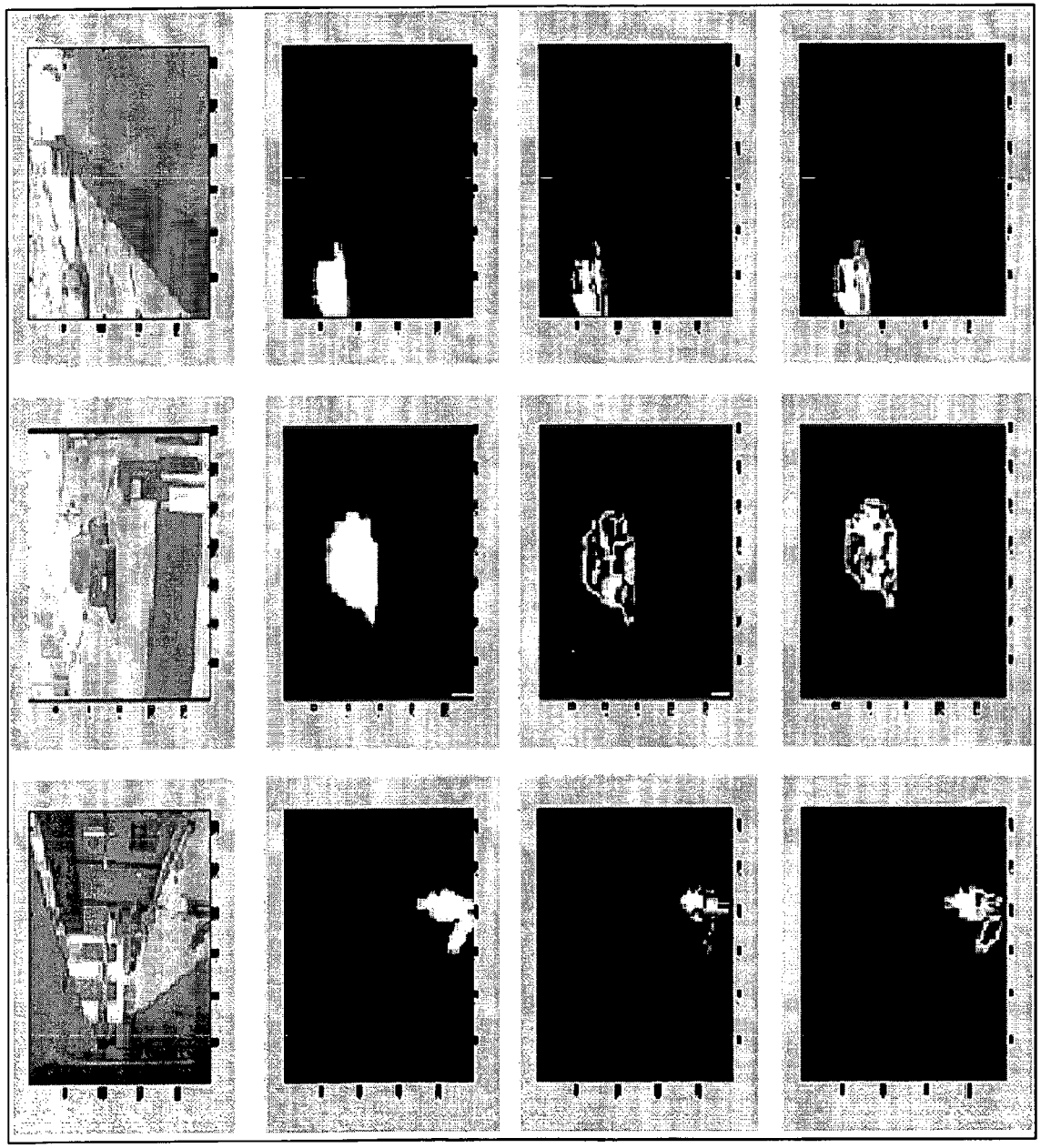
FIG. 3 illustrates output examples of a division image analysis module.

FIG. 3 compares the performances of image division analysis when using the prior art fixed threshold (such as a hard-coded grayscale range of 50-80) and the adaptive threshold embodiment just described. In FIG. 3, the first row depicts original images, the second row the VMD binary output for the original images, the third row the results of a fixed threshold approach in the image division analysis, and the fourth row an adaptive threshold approach in the image division analysis. Though the fixed threshold approach (third row) has effectively identified a shadow region for first input sequences, FIG. 3 illustrates that it has distorted the object region for the rest of the sequences. In contrast, the performance of the adaptive threshold (fourth row) approach is optimal in all scenes under consideration.

More specifically, while the effectiveness of any shadow detection algorithm is measured by how well it removes the shadow, it is also important that a shadow detection algorithm leaves the object intact. However, all shadow detection algorithms remove some of the object, but the extent of that removal should be kept to a minimum. An embodiment of the adaptive threshold approach has less detrimental impact on an object in an image than a prior art process such as the fixed threshold approach. This is illustrated for example in the second column and third and fourth rows of FIG. 3. In the third row, which illustrates the known fixed approach, the shadow removing algorithm has removed a good portion of the object (represented by the dark spaces within the outline of the car). However, as illustrated in the fourth row of column 2, the object is less affected by the shadow removal of the embodiment of the adaptive threshold approach (represented by the highly concentrated white portion within the outline of the car).

As evident from FIG. 3, even though the homogeneity property helps in detecting a uniform region in a shadow, its edge pixels (penumbra) are often left undetected. This necessitates subsequent processing to remove the penumbra regions completely. Techniques of the prior art like multi-gradient analysis have proved to be very effective in removing the penumbra region. However, these techniques require high computational resources due to complex convolution operations involved in gradient calculations. Aimed at addressing this issue, an embodiment of the invention uses a relatively simpler projection histogram technique 160 to operate on the image division analysis output for complete shadow correction. After the projection histogram analysis 160, the image is exposed to a region growing process 170.

Figure 4:
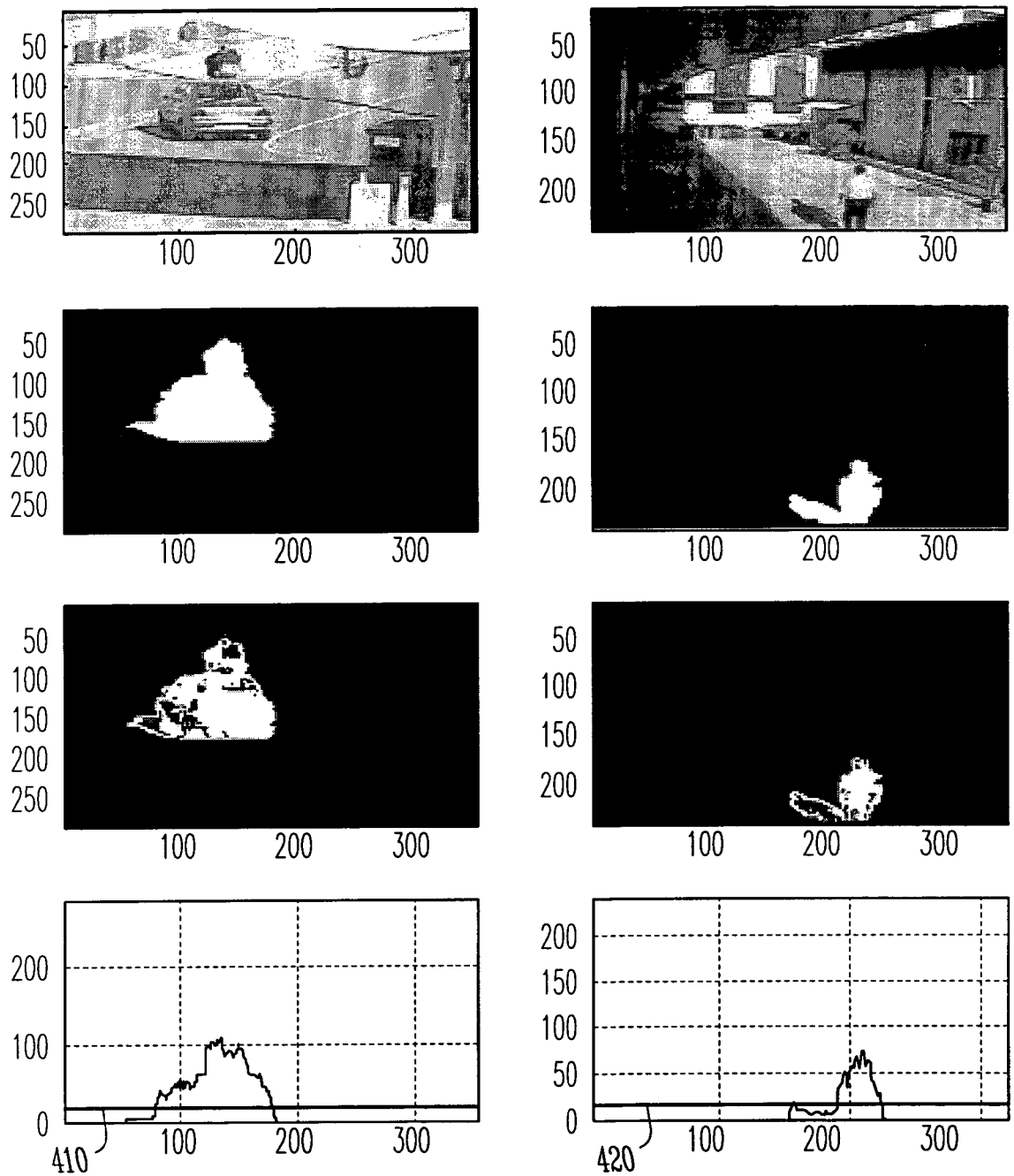
FIG. 4 illustrates examples of projection histogram analysis.
Figure 5A:
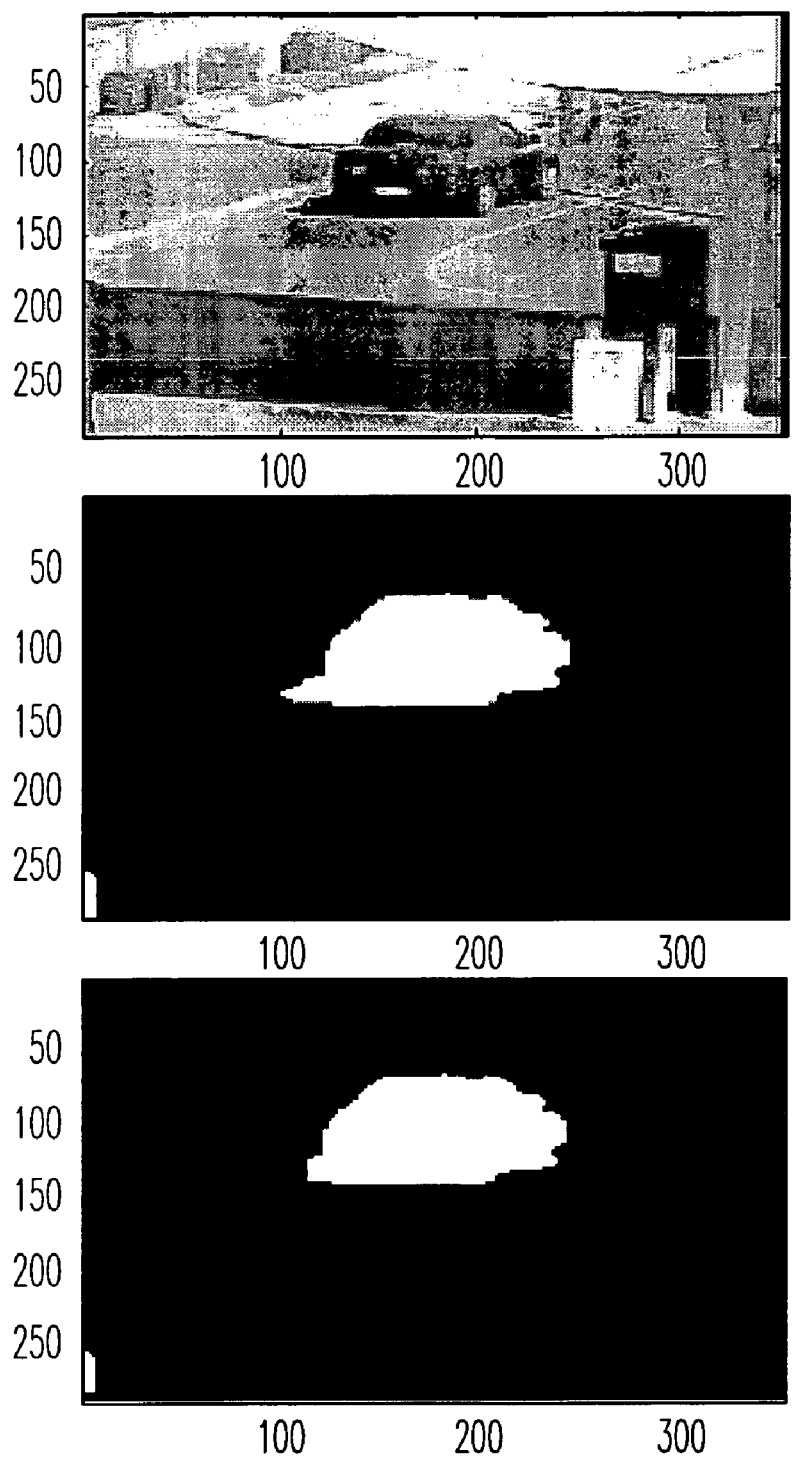
FIGS. 5A-5D illustrate examples of output from an embodiment of a shadow detection algorithm.
Figure 5B:
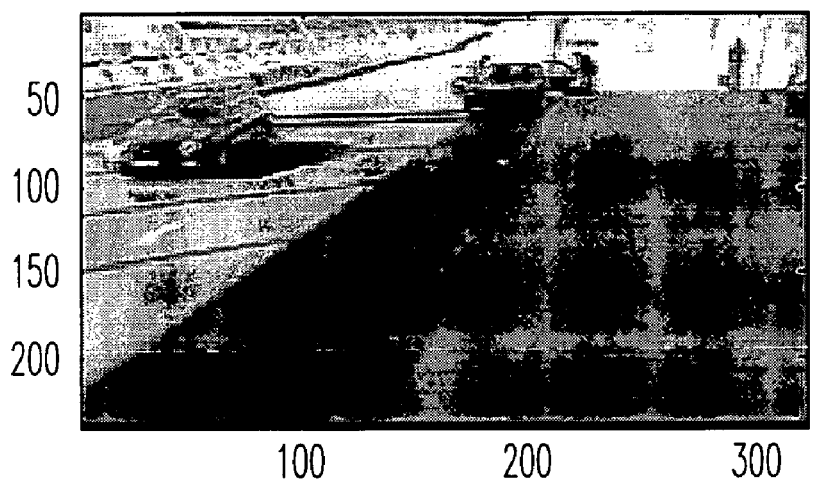
Figure 5B:
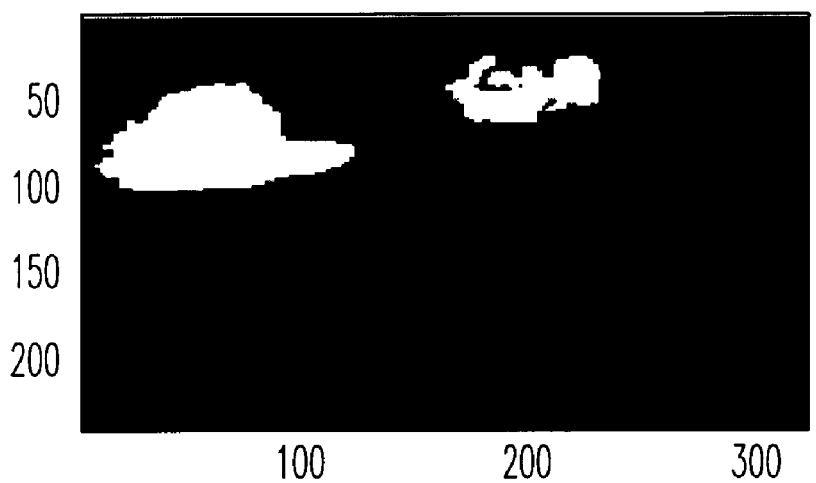
Figure 5B:
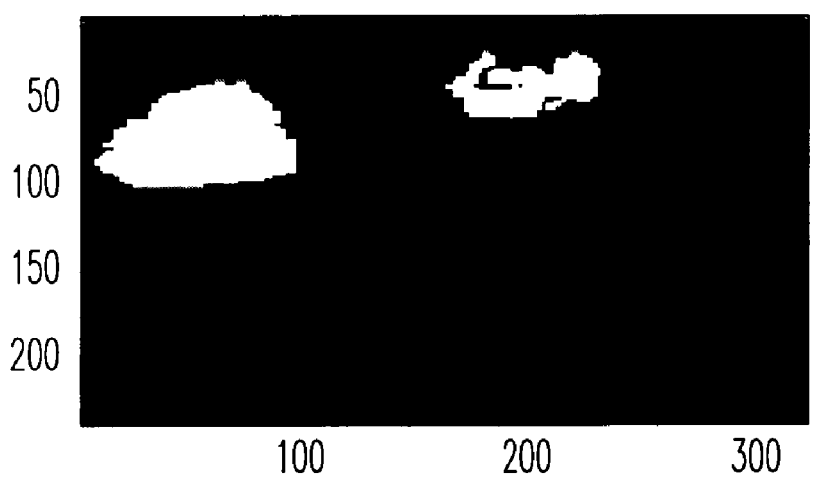
Figure 5C:
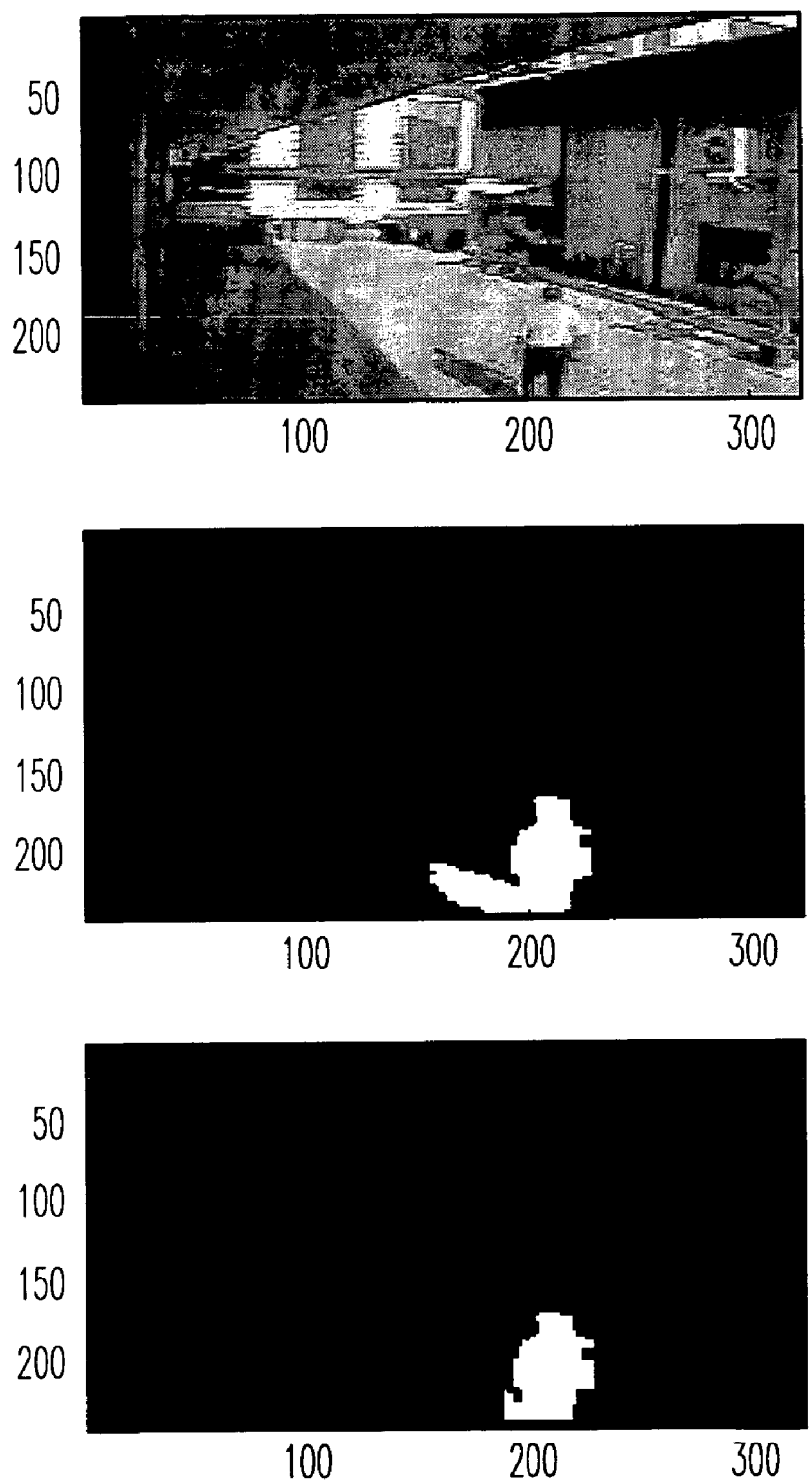
Figure 5D:
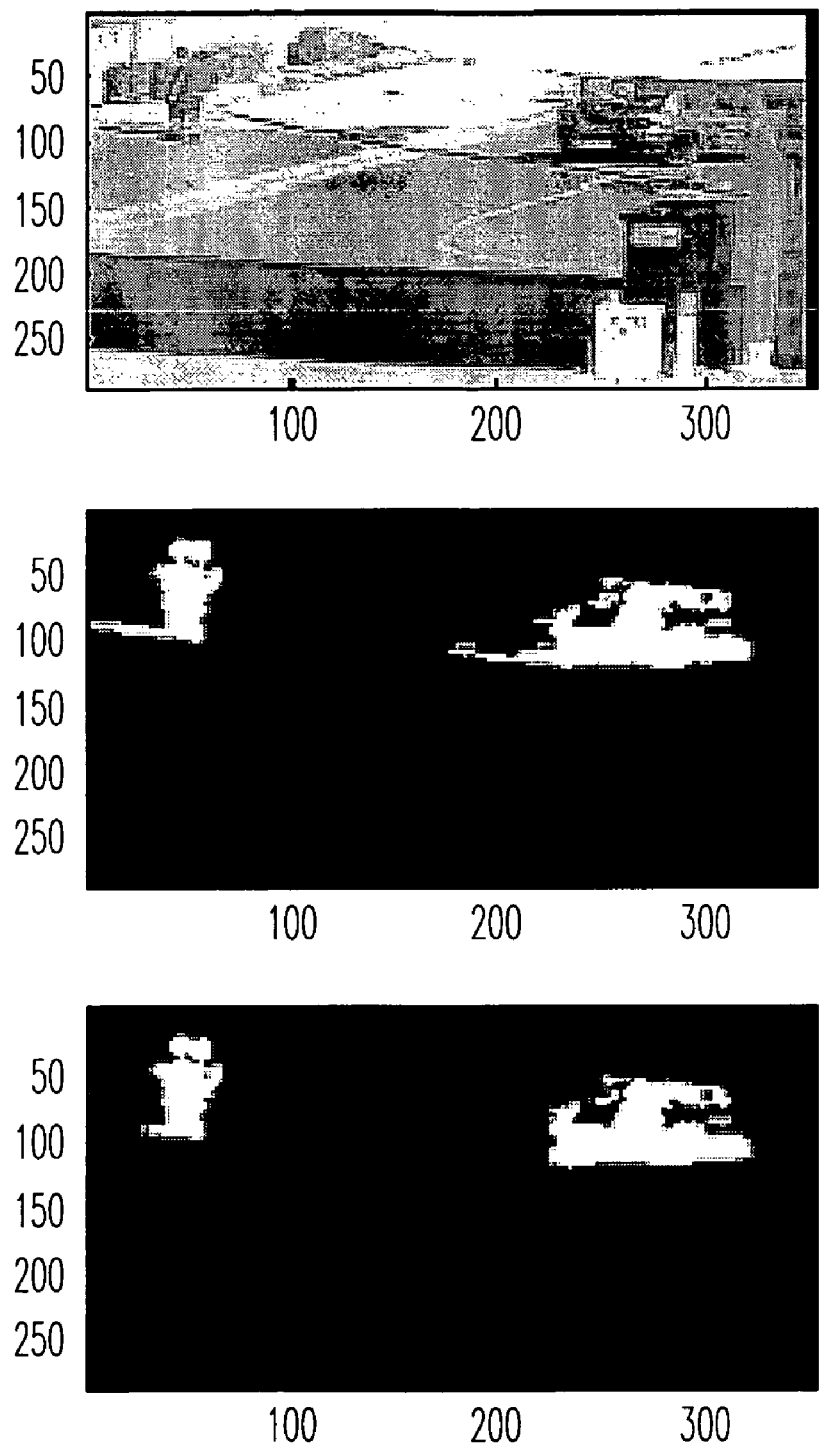

Specifically, in an embodiment, column and row projection histograms are computed on the binary image output from the image division analysis 140. A column projection histogram is the count of the number of foreground pixels in each column (162), and a row projection histogram is the count of the number of foreground pixels in each row (164). The column and row histograms are then normalized with respect to the height and the width of the MBR 115 respectively. Owing to the fact that it contains only fringe regions, histogram counts are minimum along the shadow region rather than the object region. Therefore, in a resulting histogram, pixels corresponding to low values, or values below a certain threshold, are identified as shadow regions in the image (or more particularly, penumbra of shadows), and may be removed or processed in some other manner (166). FIG. 4 illustrates sample results based on a column projection histogram.

In FIG. 4, a preset threshold (shown as line 410 and 420) applied on a column histogram count should remove penumbra regions from the shadow. As seen in FIG. 4, the penumbra of the shadow in the third row of FIG. 4 is identified by histogram values that fall below the threshold values identified by lines 410 and 420 respectively. However, a fixed threshold may affect object shape when it is moving in a distant field. Therefore, an object parameter (width and height) should also be taken into account when selecting the threshold. For example, for the images under consideration in FIG. 4, a logical AND operation between fixed threshold and a fraction of the object height has been set as a threshold for the column projection histogram analysis. Similarly, for shadow suppression involving the row projection histogram analysis, the width of the object can be considered for thresholding.

A column projection histogram for a binary image is obtained by counting the number of white pixels in a column. Similarly, a row projection histogram is obtained by counting the number of white pixels in a row. In an embodiment, image division analysis tends to remove most of the white pixels inside a shadow region—thereby leaving only penumbra. Then, the counts of the white pixels in the rows and columns are less along those rows and columns (depending on the direction in which the shadow is oriented) as compared to along the object for the binary image resulting from the image division analysis. Referring again to FIG. 4, it is illustrated that the histogram in the fourth row, a column projection histogram on a binary image from the image division analysis, identifies the penumbra region of a shadow with histogram values falling below a threshold. Therefore, with a simple histogram and threshold, the penumbra can be identified and removed.

An embodiment has been tested with variety of outdoor video sequences taken from a fixed camera with two different resolutions—352×288 and 320×240. Results for selected datasets are presented in FIGS. 5A-5D. FIGS. 5A-5D show how an embodiment successfully removes the shadow from each image, while leaving the object substantially intact.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A process comprising:
using a processor for:
   capturing a reference image;
   capturing a current image;
   calculating reference image to current image object plus shadow ratios (RTOPS);
   calculating reference image to current image object ratios (RTO);
   calculating reference image to current image shadow ratios (RTS);
   calculating an average RTOPS ratio;
   calculating an average RTO ratio;
   calculating an average RTS ratio;
   calculating a first range using said RTOPS, RTO, and RTS ratios;
   identifying a pixel as being under a shadow by multiplying a lower limit of said first range by said average RTOPS ratio and multiplying an upper limit of said first range by said average RTOPS ratio, thereby giving a second range; and
   determining whether said pixel falls within said second range.

2. The process of claim 1, further comprising:
computing a column projection histogram comprising a count of the number of foreground pixels in each column;
computing a row projection histogram comprising a count of the number of foreground pixels in each row; and
identifying penumbra of a shadow by determining locations where said histogram counts are less than a threshold value.

3. The process of claim 1, further comprising:
computing a column projection histogram comprising a count of the number of white pixels in each column;
computing a row projection histogram comprising a count of the number of white pixels in each row; and identifying penumbra of a shadow by determining locations where said histogram counts are less than a threshold value.

4. The process of claim 1, wherein said RTOPS ratios, said RTO ratios, and said RTS ratios are calculated by comparing the intensity of a pixel in said current image to the intensity of a corresponding pixel in said reference image.

5. The process of claim 1, wherein said first range is calculated by comparing said average RTO ratio and said average RTS ratio to said average RTOPS ratio.

6. The process of claim 1, wherein said reference image comprises a background image from background-foreground learning in a video motion detection algorithm.

7. The process of claim 1, wherein said current image comprises:
   an object;
   a shadow associated with said object; and
   a minimum bounded region comprising coordinates enclosing said object and said shadow.

8. A process comprising:
   using a processor for:
      capturing a reference image;
      capturing a current image;
      identifying a shadow in said current image using an adaptive image division analysis; and
      identifying penumbra of said shadow using a projection histogram analysis;
   wherein said adaptive image division analysis comprises:
   calculating reference image to current image object plus shadow ratios (RTOPS);
   calculating reference image to current image object ratios (RTO);
   calculating reference image to current image shadow ratios (RTS);
   calculating an average RTOPS ratio;
   calculating an average RTO ratio;
   calculating an average RTS ratio;
   calculating a first range using said RTOPS, RTO, and RTS ratios;
   identifying a pixel as being under a shadow by multiplying a lower limit of said first range by said average RTOPS ratio and multiplying an upper limit of said first range by said average RTOPS ratio, thereby giving a second range; and
   determining whether said pixel falls within said second range.

9. The process of claim 8, wherein said projection histogram analysis comprises:
   computing a column projection histogram comprising a count of the number of foreground pixels in each column;
   computing a row projection histogram comprising a count of the number of foreground pixels in each row; and
   identifying penumbra of a shadow by determining locations where said histogram counts are less than a threshold value.

10. The process of claim 8, further comprising:
    computing a column projection histogram comprising a count of the number of white pixels in each column;
    computing a row projection histogram comprising a count of the number of white pixels in each row; and
    identifying penumbra of a shadow by determining locations where said histogram counts are less than a threshold value.

11. The process of claim 8, wherein said RTOPS ratios, said RTO ratios, and said RTS ratios are calculated by comparing the intensity of a pixel in said current image to the intensity of a corresponding pixel in said reference image.

12. The process of claim 8, wherein said first range is calculated by comparing said average RTO ratio and said average RTS ratio to said average RTOPS ratio.

13. The process of claim 8, wherein said reference image comprises a background image from background-foreground learning in a video motion detection algorithm.

14. The process of claim 8, wherein said current image comprises:
    an object;
    a shadow associated with said object; and
    a minimum bounded region comprising coordinates enclosing said object and said shadow.

15. A computer readable memory device comprising instructions thereon for executing a process comprising:
    capturing a reference image;
    capturing a current image;
    calculating reference image to current image object plus shadow ratios (RTOPS);
    calculating reference image to current image object ratios (RTO);
    calculating reference image to current image shadow ratios (RTS);
    calculating an average RTOPS ratio;
    calculating an average RTO ratio;
    calculating an average RTS ratio;
    calculating a first range using said RTOPS, RTO, and RTS ratios;
    identifying a pixel as being under a shadow by multiplying a lower limit of said first range by said average RTOPS ratio and multiplying an upper limit of said first range by said average RTOPS ratio, thereby giving a second range; and
    determining whether said pixel falls within said second range.

16. The computer readable memory device of claim 15, further comprising instructions for:
    computing a column projection histogram comprising a count of the number of foreground pixels in each column;
    computing a row projection histogram comprising a count of the number of foreground pixels in each row; and
    identifying penumbra of a shadow by determining locations where said histogram counts are less than a threshold value.

17. The computer readable memory device of claim 15, further comprising instructions for:
    computing a column projection histogram comprising a count of the number of white pixels in each column;
    computing a row projection histogram comprising a count of the number of white pixels in each row; and
    identifying penumbra of a shadow by determining locations where said histogram counts are less than a threshold value.

18. The computer readable memory device of claim 15, wherein said RTOPS ratios, said RTO ratios, and said RTS ratios are calculated by comparing the intensity of a pixel in said current image to the intensity of a corresponding pixel in said reference image.

19. The computer readable memory device of claim 15,
    wherein said first range is calculated by comparing said average RTO ratio and said average RTS ratio to said average RTOPS ratio; and further
    wherein said reference image comprises a background image from background-foreground learning in a video motion detection algorithm.

\* \* \* \* \*